United States Patent [19]

Pusa et al.

[11] 4,133,093

[45] Jan. 9, 1979

[54] METHOD FOR PRODUCING A CYLINDER LOCK

[75] Inventors: Ilkka Pusa; Oiva Hurskainen, both of Joensuu, Finland

[73] Assignee: Oy Wartsila AB, Helsinki, Finland

[21] Appl. No.: 754,008

[22] Filed: Dec. 27, 1976

[30] Foreign Application Priority Data

Dec. 31, 1975 [FI] Finland .................................. 753744

[51] Int. Cl.2 ......................... B23P 13/00; B23P 15/00

[52] U.S. Cl. ........................................ 29/434; 29/445; 70/366

[58] Field of Search ................. 29/434, 445, DIG. 26; 70/365, 366, 376, 377

[56] References Cited

U.S. PATENT DOCUMENTS

| | | | |
|---|---|---|---|
| 914,700 | 3/1909 | Christensen | 29/DIG. 26 |
| 1,677,432 | 7/1928 | Croning | 29/445 |
| 1,953,535 | 4/1934 | Hurd | 29/445 |
| 1,979,939 | 11/1934 | Jacobi | 29/445 |
| 2,570,765 | 10/1951 | Cerf, Jr. | 29/445 |
| 3,002,268 | 10/1961 | Spain | 29/445 |
| 3,695,073 | 10/1972 | Prescott | 70/366 |
| 3,972,210 | 9/1975 | Toivonen et al. | 70/366 |

FOREIGN PATENT DOCUMENTS

| | | | |
|---|---|---|---|
| 266276 | 2/1927 | United Kingdom | 29/445 |

*Primary Examiner*—C.W. Lanham
*Assistant Examiner*—Daniel C. Crane
*Attorney, Agent, or Firm*—Haseltine, Lake & Waters

[57] ABSTRACT

A method for the production of a cylinder lock with a fixed cylinder housing, a turnable cylinder therein and a number of locking discs turnable by the key of the lock; a locking bar operable in the radial direction by the locking discs locks the cylinder to the cylinder housing. The method provides the lock cylinder with locking discs without peripheral recesses allowing the opening of the lock; the locking discs are turned with a key member into an opening position defined by the key member; and a joint groove corresponding to the form of the locking bar is machined into the set of locking discs at the position of the locking bar. Each of the locking discs is provided at the right position with a peripheral recess allowing the opening of the lock. The operation can be repeated with other key members for providing the lock mechanism with a desired number of opening combinations usuable in mastered locking systems.

5 Claims, 3 Drawing Figures

METHOD FOR PRODUCING A CYLINDER LOCK

Figure 1:
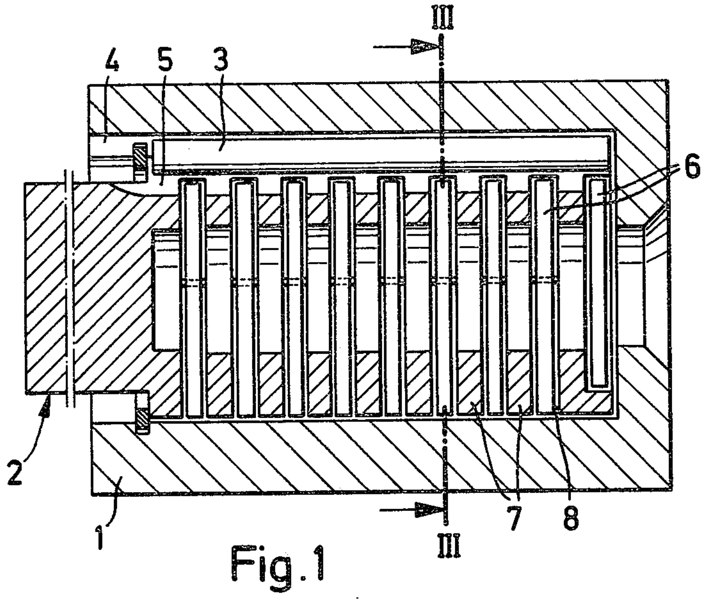

The invention relates to a method for the production of a cylinder lock comprising an immovable cylinder housing and therein a turnable cylinder and a number of locking discs turnable by the key of the lock, and, operable in a radial direction by the locking discs, a locking bar, which in a certain position locks the cylinder to the cylinder housing.

Cylinder locks in general and especially cylinder locks of the kind refered to are manufactured so, that all the lock parts are first machined to obtain the desired form and thereafter are assembled to form a complete lock in which the locking members, discs or pins, are so chosen, that the desired lock combination is obtained. This production method is unfavorable, because it presupposes that there is a relatively great number of different locking members, and that always the right one of them is chosen and also that the chosen member is put at the right place. It is evident that mistakes may easily occur during the assembly, and it is difficult to establish later on the possible malfunctions caused thereby. As nowadays very often rather large lock series are made comprising several exactly defined mastered locking systems, also a small assembly mistake in some of the locks can cause considerable disturbance in the function of the whole locking system.

The object of the invention is to present a production method by means of which it is possible to eliminate the drawbacks mentioned above, and at the same time create suitable conditions for a demanding lock production with a high degree of mechanisation and automation. The invention is characterized in that first the lock cylinder is provided with locking discs from which peripheral recesses allowing the opening of the lock have been left out, and that thereafter, the locking discs with a key or a corresponding member are turned into an opening position defined by the key, after which a joint groove, suitably corresponding to the form of the locking bar is machined into the set of locking discs at the position of the locking bar, so that thereby a peripheral recess allowing the opening of the lock is formed at the right position in each of the locking discs. This method gives the advantage that the key of the lock directly determines the lock combination so that it is not possible that the lock by mistake is given a combination different from the key combination. In case the lock belongs to a mastered locking system, the said machining phase can be carried out once more upon turning by another key the locking discs to another opening position of the lock, and thereby a complete correspondence between the key and the lock combination is again obtained. It is possible to go on in this way until the lock has been provided with the desired number of lock combinations.

In a disc cylinder lock the locking bar moves in a slot in the wall of the cylinder. This slot can be made at the same time as the peripheral recesses of the locking discs, because the peripheral recesses are machined exactly at the position of the locking bar. Thereby two different machining operations can be made in one working operation, for instance by milling, which is likely to reduce the production costs of the lock.

With special advantage the production method according to the invention can be applied to the production of a cylinder lock according to U.S. Patent application Ser. No. 727,524, entitled Cylinder Lock filed Sept. 28, 1976. In this kind of lock, there is between adjacent locking discs an immovable intermediate wall by means of which the moving possibilities of the locking discs during the machining phase are considerably smaller than in a normal disc cylinder lock in which there is a resilient intermediate disc between adjacent locking discs, so that the whole disc set forms a rather yielding pile of discs. Since locks according to U.S. Patent application Ser. No. 727,524, entitled Cylinder Lock filed Sept. 28, 1976. also in other respects are well suitable for automatic locking disc insertion, it is evident that the method according to the invention with respect to the production of this kind of lock provides especially good possibilities for creating a lock production with a very high degree of automation.

The invention also relates to a cylinder lock, which has been produced by making use of the method described above.

Figure 2:
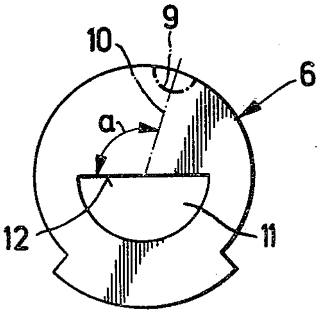
Figure 3:
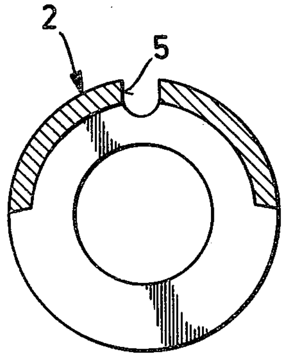

In the following, the invention is described more in detail with reference to the attached drawing in which FIG. 1 shows an axial section of a lock according to the invention, FIG. 2 shows a locking disc of a lock according to the invention before the final machining operation, and FIG. 3 shows a cross-section of the cylinder of a lock according to the invention.

In the drawing, 1 designates the cylinder housing and 2 the turnable cylinder of a lock. Between the cylinder 2 and the cylinder housing 1 there is a locking bar 3, which, in the locking position of the lock, is partly received by a groove 4 in the cylinder housing, and partly by a slot 5 in the cylinder. In the cylinder, there is a number of locking discs 6, which by the key of the lock are turned into a position releasing the cylinder, whereby peripheral recesses provided in the locking discs line up at the position of the locking bar 3, so that the locking bar can move inwardly in a radial direction away from the groove 4 in the cylinder housing. The cylinder 2 is provided with immovable intermediate walls 7, which define a moving space 8 for each of the locking discs 6. The construction and the production of a lock of this type has been described in detail in U.S. Patent application Ser. No. 727,524, entitled Cylinder Lock filed Sept. 28, 1976, hereby incorporated by reference.

FIG. 2 shows a locking disc of a lock according to the invention in the shape it has when it is inserted into the lock. Then the locking disc 6 is still not provided with a peripheral recess allowing the opening of the lock, the position of which recess is shown by dash and dot lines 9 in FIG. 2. The combination value of the locking discs defines the angle a between the radius 10 to the position of the peripherical recess 9, and the turning edge 12 of the central opening 11 of the locking disc. The angle a is dependent on how much the combination surface of the key, present at the position of each of the locking discs, turns the locking disc in question. In order to ensure that in a lock according to the invention the angle a is correct in each locking disc, the peripheral recesses 9 of the locking discs are made, according to the method of the invention, first when the locking discs have been inserted into the lock and turned by the key into the opening position of the lock mechanism. At this stage the cylinder has still not been inserted into the cylinder housing 1, so that the machining operation can be carried out, for instance by milling, at the position of the slot 5 for the locking bar 3 of the lock. It is also possible that said slot 5 is made in the same working operation, that is, so that the slot 5 as well as the peripheral recesses 9 of the locking discs are milled at the same time. In a lock belonging to a mastered locking system, a new row of pheripheral recesses is produced upon turning the locking discs by another key belonging to the lock, into another opening position of the lock etc. until the lock has been provided with the desired number of opening combinations.

FIG. 3 shows a cross-section of the cylinder of the lock at the position of a locking disc space 8. The primary object of this figure is to show in detail together with FIG. 1 the construction of the cylinder 2 and the position and form of the locking bar slot 5.

The invention is not limited to the shown embodiments, but several modifications of the invention are feasible within the scope of the attached claims.

We claim:

1. A method for the production of a cylinder lock employing a fixed cylinder housing and a cylinder turnable by the key of the lock, a number of locking discs being also turnable by said key at a first stage relative to said cylinder; a locking bar which, in a designated position, locks said cylinder to said cylinder housing and being guided in the radial direction of the lock by said locking discs, said method comprising the steps of: providing said lock cylinder with a set of identical locking discs of sheet metal formed without peripheral recesses for allowing opening of the lock; turning said locking discs with a key member into an opening position defined by said key member; and machining a joint groove at the position of said locking bar into said locking discs, said joint groove suitably corresponding to the form of said locking bar thereby providing at the right position a peripheral recess for the opening of the lock with said key at each of said locking discs.

2. A method as claimed in claim 1, comprising the steps of: forming in the same working plane a slot for said locking bar in said cylinder and peripheral recesses allowing the opening of the lock in said locking discs.

3. A method as claimed in claim 1, for a lock belonging to a mastered lock series, comprising the steps of: removing said key member, inserting another key member and thereby bringing said locking discs into a new position, and thereafter repeating said peripheral recess machining operation until a desired number of opening combinations is obtained in said lock for different key combinations.

4. A method as claimed in claim 1, comprising the steps of: shaping said cylinder to have an immovable intermediate wall formed between adjacent locking discs.

5. A method for the production of a cylinder lock formed of an outer cylinder enclosing a rotatable inner cylinder which surrounds a plurality of locking discs turnable by the key of the lock and, between said outer cylinder and the peripheral edges of said locking discs, a locking bar locking said inner cylinder to said outer cylinder, said bar during locking of the inner cylinder is located partly in a groove in the inner wall of said outer cylinder and is movable to a position releasing said inner cylinder by passing into a channel formed jointly by locking bar notches in the peripheral edges of said locking discs when brought to a certain position, said method comprising the steps of: providing said lock cylinder with a set of identical locking discs of sheet metal without a locking bar notch for allowing opening of the lock; turning said locking discs with a key member into an opening position defined by said key member; machining into said locking discs a joint groove at the position of said locking bar, said joint groove suitably corresponding to the form of said locking bar providing at the right position each of said locking discs with a locking bar notch for opening the lock with said key.

* * * * *